United States Patent [19]

Osborn et al.

[11] 4,353,685

[45] Oct. 12, 1982

[54] TURBOCHARGER COMPRESSOR ROTOR RETAINER

[75] Inventors: Norbert L. Osborn, Irving; John R. Rae, Dallas, both of Tex.

[73] Assignee: WRR Industries, Inc., Dallas, Tex.

[21] Appl. No.: 158,147

[22] Filed: Jun. 10, 1980

Related U.S. Application Data

[63] Continuation-in-part of Ser. No. 917,066, Jun. 19, 1978, abandoned.

[51] Int. Cl.³ .................... F01D 5/04; F04B 35/00
[52] U.S. Cl. .................... 417/406; 403/261; 416/244 A
[58] Field of Search ............... 417/405, 406; 416/182, 416/185, 204, 207, 214, 223 B, 244 R, 244 A, 244 B; 403/16, 259, 261, 263, 273, 345, 361, 376

[56] References Cited

U.S. PATENT DOCUMENTS

| | | | |
|---|---|---|---|
| 1,827,770 | 10/1931 | Suter | 403/273 X |
| 2,366,459 | 1/1945 | Rosa | 403/261 X |
| 2,730,387 | 1/1956 | White | 403/259 |
| 2,911,138 | 11/1959 | Birmann | 417/406 X |
| 3,017,071 | 1/1962 | Lejk et al. | 417/406 X |
| 3,612,719 | 10/1971 | Nomura | 416/185 X |
| 4,053,261 | 10/1977 | Pennig | 416/244 A |
| 4,125,344 | 11/1978 | Tiefenbacher | 416/244 A X |

FOREIGN PATENT DOCUMENTS

77950  9/1949  Czechoslovakia .................. 403/261

*Primary Examiner*—Michael Koczo, Jr.
*Attorney, Agent, or Firm*—Richards, Harris & Medlock

[57] ABSTRACT

A retainer for securing the compressor rotor (172) to the compressor-turbine shaft (160) of a turbocharger includes a retaining sleeve (180) having an aperture therethrough for mounting the sleeve onto the shaft adjacent the compressor rotor to prevent movement of the rotor on the shaft in the direction of the sleeve. The sleeve has an inner bore (180a) having a diameter forming an interference fit on the shaft such that the sleeve prevents movement of the compressor rotor on the shaft. In one embodiment, a lug (300) extends from the sleeve (180) and engages the compressor rotor to transmit a rotational force from the shaft to the rotor through the sleeve and lug.

14 Claims, 8 Drawing Figures

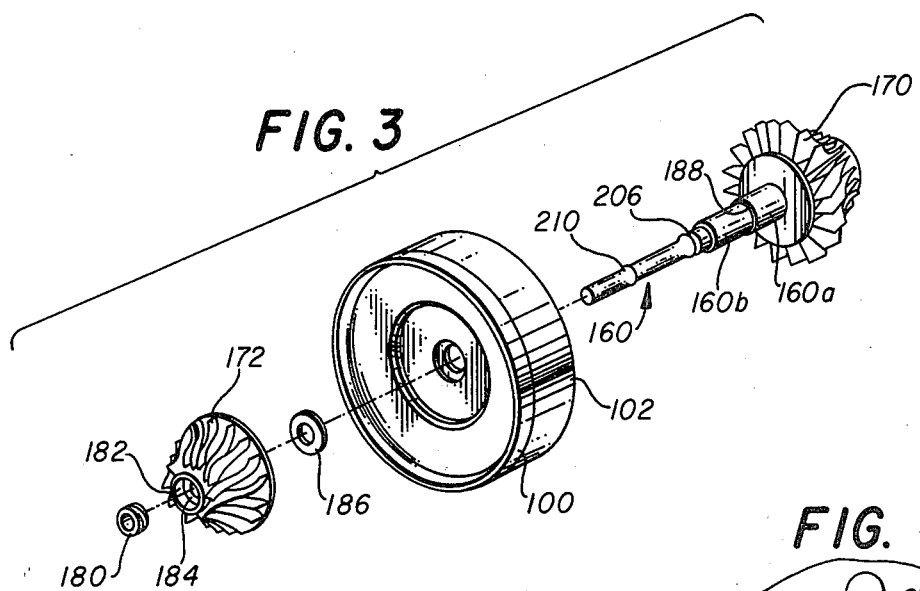
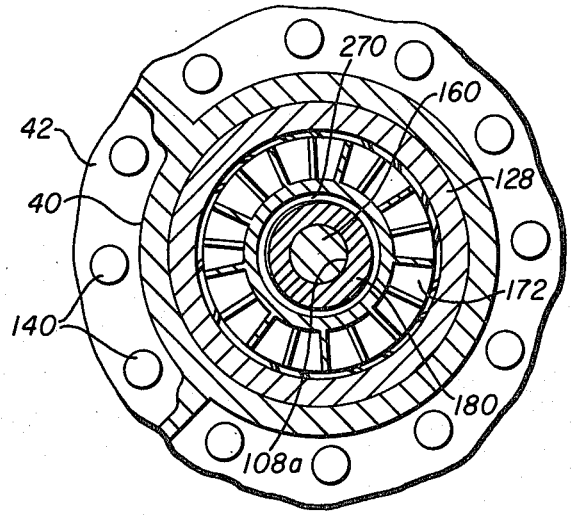
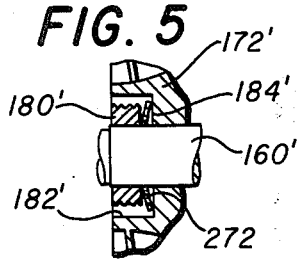
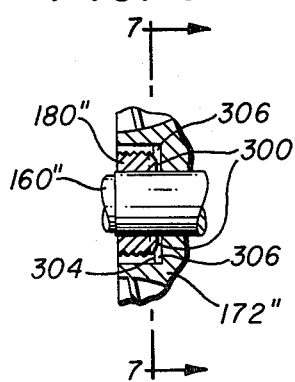
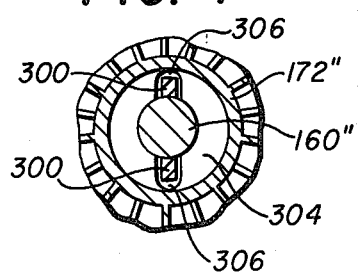
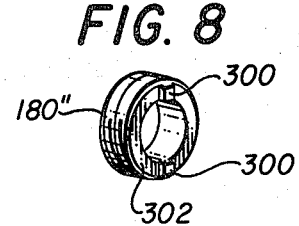

TURBOCHARGER COMPRESSOR ROTOR RETAINER

CROSS REFERENCE TO RELATED APPLICATION

This application is a continuation-in-part of application Ser. No. 917,066, filed June 19, 1978 by the present applicant and entitled "Turbocharger Compressor Rotor Retainer," now abandoned.

TECHNICAL FIELD

The present invention relates to turbochargers or turbomachinery, and more particularly to retaining structure for securing the turbocharger compressor rotor on the compressor-turbine shaft.

BACKGROUND ART

Power output of a naturally aspirated internal combustion engine may be significantly increased by the addition of a turbocharger. Turbochargers include a compressor for providing air or an air fuel charge at a greater than ambient pressure and density to the combustion chamber of the internal combustion engine. The turbocharger also includes a turbine, driven by exhaust gases from the turbocharged engine.

In most prior art turbocharger designs, the compressor and turbine rotors are fixed for rotation on a single shaft. The shaft is normally supported on bearing assemblies with the compressor rotor and turbine rotor attached on opposite ends of the shaft with the bearing support assemblies positioned therebetween. It is common practice to attach the compressor wheel to the shaft by the engagement of an internally threaded nut onto the threaded end of the shaft. The nut is tightened onto the threaded shaft to fix the compressor rotor to the turbine rotor.

In conventional turbocharger designs, attachment of the compressor to the compressor-turbine shaft by a nut engaged on the threaded end of the shaft has been followed almost universally without regard to the limitations presented by this arrangement. In part, this approach has been routinely followed by designers and manufacturers of turbochargers because it has been successful to the extent that it accomplishes its assigned function. However, where the confronting surfaces between the face of the nut and the compressor rotor are not precisely perpendicular to the longitudinal axis of the shaft, tightening of the nut to engage it against the compressor rotor results in bending of the shaft. This in turn introduces an imbalance in the compressor rotor.

DISCLOSURE OF THE INVENTION

New turbocharger designs have required the development of new methods of attaching the compressor rotor to the compressor-turbine shaft. Although the present invention was born out of the need for a new and improved method for securing the compressor rotor to the compressor-turbine shaft in a new turbocharger arrangement, the invention may likewise be used to secure the compressor rotor to the shaft in conventional turbocharger designs.

The turbocharger design to which the present invention is most appropriately adapted includes a turbine rotor fixedly attached to one end of a shaft with a compressor rotor fitted on the shaft for rotation with the turbine rotor. The shaft is rotatably supported by bearing assemblies such that the compressor and turbine rotors are overhung to one side of the assemblies with the turbine rotor separated from the bearing assemblies by the compressor rotor.

Antifriction ball bearing assemblies support the compressor-turbine shaft. The bearing assemblies include a first and second inner raceway formed in the compressor-turbine shaft. A fixed outer raceway corresponding to the first inner raceway attached to the turbocharger housing and a plurality of balls is received between the fixed outer raceway and the first inner raceway. A second outer raceway ring is provided and is slidable relative to the first outer raceway. This second outer raceway ring is slidable relative to the housing and a compression spring acts between the turbocharger housing and the ring to bias the ring away from the first outer raceway and in engagement with balls positioned between the ring and the second inner raceway. At the same time, the first outer raceway, attached to the turbocharger housing, is engaged against the balls between such raceway and the first inner raceway on the compressor-turbine shaft.

The present turbocharger design includes ball bearing assemblies employing inner races integral with the shaft permitting thereby a larger diameter shaft and thus providing a very "stiff" shaft. Additionally, this bearing arrangement provides a very tight bearing system permitting very little radial or axial movement. As a result, this turbocharger design substantially reduces the clearance required between the compressor and turbine rotors and the surround housing.

However, because the inner raceways are formed directly in the compressor-turbine shaft, the shaft must be heat treated to extremely high degrees of hardness. As a result, the hardened shaft is extremely difficult and costly to thread for purposes of receiving a nut thereon to secure the compressor rotor to the shaft. Further, threading the shaft such that the center line of the threads corresponds with the center line of the shaft is extremely difficult. Also, keeping the threads at right angles to the axis of the shaft requires more attention than would otherwise be required.

Problems in cutting threads in a heat treated shaft may sometimes be eliminated by cutting the threads prior to heat treating of the shaft. However, deformation of the cut threads often results from this sequence of operations and, thus, such an approach is not feasible on a mass production scale.

Moreover, threading the shaft creates stress concentration points which normally result in premature fatiguing and failure at the threaded portion of the shaft. To overcome the stress concentration problems, the threads may be softened by "induction" heat treatment to relieve brittleness. However, this requires an extra production step which necessarily raises costs.

The present invention provides a retainer "nut" for securing the compressor rotor to the compressor-turbine shaft without requiring threading of the shaft. The nut includes a retaining sleeve having a bore therethrough for mounting the sleeve onto the shaft in abutment against the compressor rotor to retain the rotor in a fixed position on the shaft. The sleeve bore has a diameter forming an interference fit over the shaft such that the sleeve resists longitudinal movement of the compressor rotor along the shaft.

In accordance with one embodiment of the invention, the compressor rotor is counterbored concentric with the aperture for receiving the compressor-turbine shaft.

The outer diameter of the retaining sleeve is sized to permit the sleeve to be engaged within the counterbore. The sleeve is formed with threads on its external surface to permit engagement of the sleeve with a special tool for extracting the sleeve from the shaft when necessary. The hardness of the shaft makes the operation of engagement of the sleeve on the shaft and removal therefrom possible without damage or deformation to the shaft. In accordance with a further embodiment of the invention, a lug extends from the retaining sleeve and engages the compressor rotor to transmit a rotational force from the shaft to the compressor rotor through the sleeve and lug. This lug extends from the face of the retaining sleeve confronting the compressor rotor. The lug is received into a corresponding groove in the face of the compressor rotor. In a primary embodiment of the invention, where the lug is employed to transmit force from the sleeve to the compressor rotor, the sleeve is pressed onto the shaft adjacent to, but not in contact with, the compressor rotor.

BRIEF DESCRIPTION OF THE DRAWINGS

For a more complete understanding of the present invention, and for further details and advantages thereof, reference is now made to the following description taken in conjunction with the accompanying drawings, in which:

FIG. 3 is an exploded perspective view showing the turbine rotor, compressor-turbine shaft, the compressor and turbine backwalls, compressor bushing, compressor rotor and retaining sleeve;

FIG. 4 is a section view taken along lines 4—4 of FIG. 2;

FIG. 5 is an alternative embodiment of the present invention showing the use of a spring member between the retaining sleeve and the compressor rotor;

FIG. 6 illustrates a section view through the compressor rotor shaft showing an alternate embodiment of the present invention wherein the rotational forces of the compressor rotor shaft are transmitted to the compressor rotor by lugs extending from the retaining sleeve for contact with the compressor rotor;

FIG. 7 illustrates a section view taken along lines 7—7 of FIG. 6; and

FIG. 8 illustrates a perspective view of the retaining sleeve shown in FIGS. 6 and 7.

DETAILED DESCRIPTION

Figure 1:
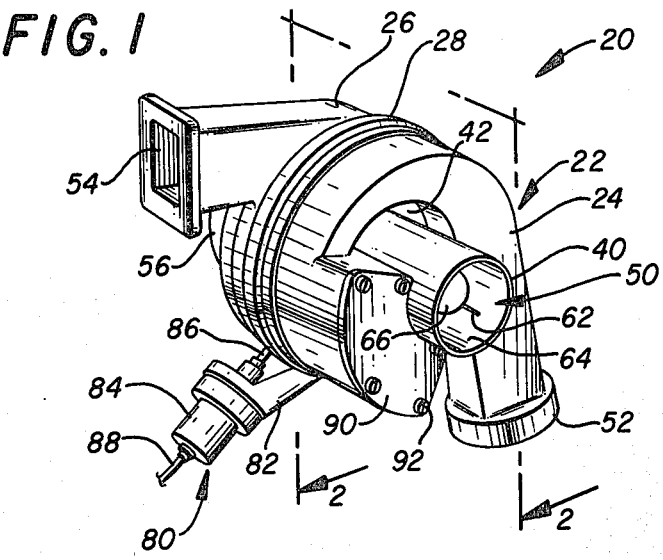
FIG. 1 is a perspective view of a turbocharger embodying the present invention.

FIG. 1 is a perspective view of a turbocharger 20 embodying the present invention. The turbocharger includes an outer structure 22 consisting of a compressor housing unit 24 coupled to a turbine housing unit 26 by a V-clamp band 28.

Figure 2:
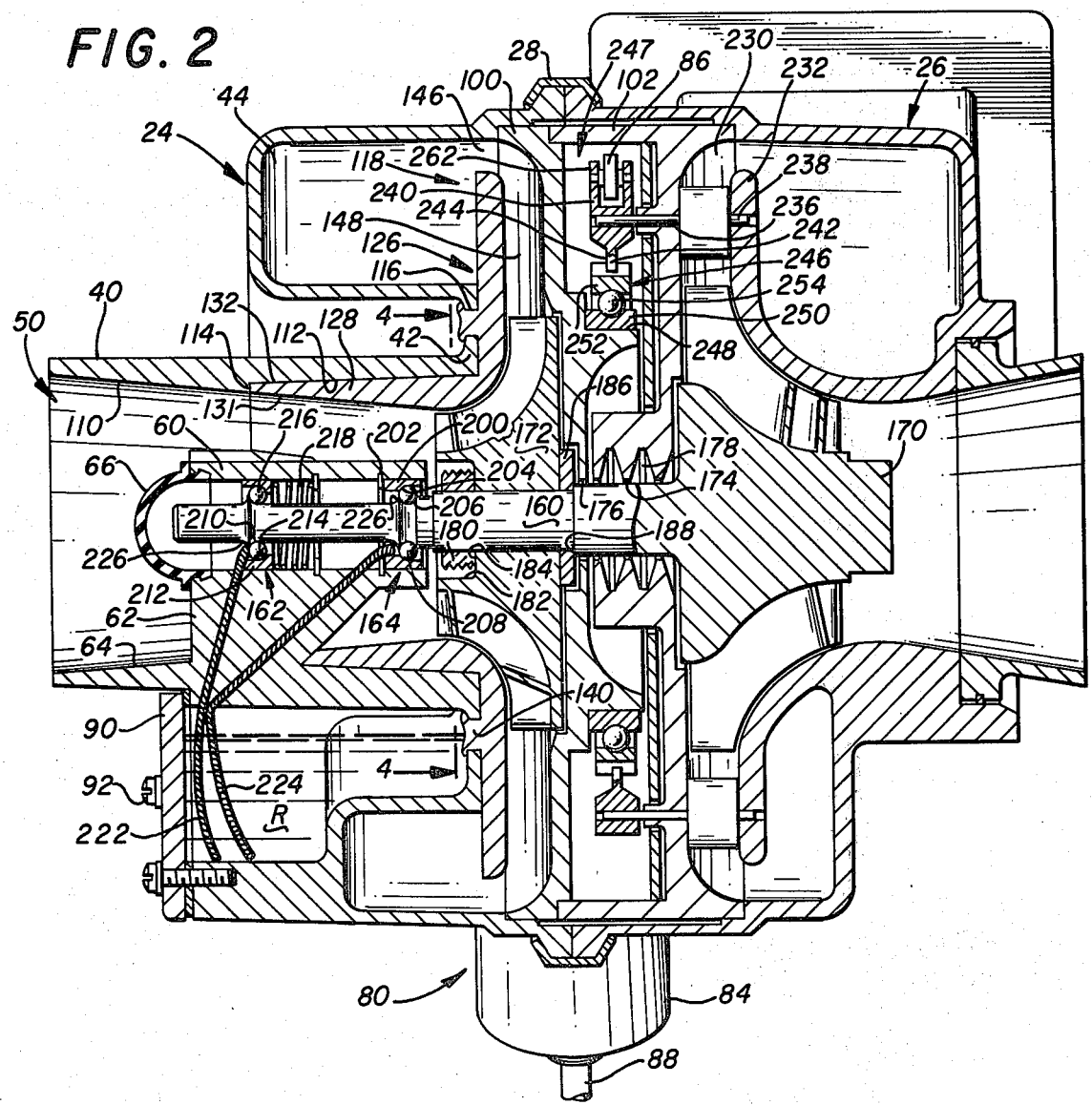
FIG. 2 is a vertical section taken along lines 2—2 of the turbocharger illustrated in FIG. 1.

Referring to FIGS. 1 and 2, compressor housing unit 24 includes a tubular inlet port 40 with a transverse wall 42 attached to one end of port 40 and extending outwardly therefrom. A circumferential chamber 44 is attached from wall 42. Inlet port 40 defines a compressor air inlet 50 and circumferential chamber 44 defines a compressor exhaust 50. Turbine housing 26 defines a turbine air inlet 54 and a turbine exhaust 56.

In operation of the turbocharger, air is drawn into inlet 50 and compressed air is discharged from exhaust 52 to an internal combustion engine to which the turborcharger is mounted. Exhaust air from the engine is channeled into turbine air inlet 54 to drive the turbocharger turbine and is exhausted through turbine exhaust 56.

Referring still to FIGS. 1 and 2, a bearing support cylinder 60 is mounted within inlet port 40 by a plurality of vanes 62 extending from the inside wall surface 64 of inlet port 40. A cap 66 is mounted over the end of support cylinder 60. A piston type actuator 80 is mounted by bracket 82 (FIG. 1) to turbine housing 26. Actuator 80 includes a pressure controlled cylinder 84 operated to extend and retract control rod 86 as will be discussed hereinafter in greater detail. An air line 88 provides air to cylinder 84 as necessary to operate rod 86. An oil reservoir cover plate 90 is attached to compressor housing unit 24 by a plurality of screws 92.

Referring specifically to FIG. 2, a compressor backwall 100 and a turbine backwall 102 are positioned intermediate of compressor housing unit 24 and turbine housing unit 26 when these two units are assembled. These four components are piloted one to another and held in assembly by V-clamp 28. Compressor housing unit 24 includes a tubular inlet port 40 with a transverse wall 42 attached to one end thereof to one of the inlet ports and extending outwardly therefrom. A circumferential chamber 44 is attached to the end of wall 42 remote from inlet port 40 and has a varying area around its circumference increasing to the discharge provided by compressor exhaust 52 (FIG. 1).

Inlet port 40 has a first inside wall portion 110 having a converging diameter toward wall 42 and a second inside wall portion 112 joined to first inside wall portion 110 by a step 114. The second inside wall portion 112 has a diverging diameter toward wall 42. Wall 42 has a plurality of circumferentially spaced apertures 116 therethrough. Chamber 44 has an opening 118 substantially in the plane of wall 42 in addition to compressor exhaust 52.

A forward compressor wall insert 126 includes a tubular throat 128 and a circular disc 130 attached transversely from one end of throat 128. Throat 128 has an inside wall surface 131 having a diameter converging toward disc 130 and an outer surface 132 having a diameter diverging toward disc 130. The diverging diameter surface 132 corresponds to the diverging surface of inside wall portion 112 of inlet port 40 such that throat 128 may be inserted within and mated with inlet port 40. The converging diameter inside wall surface 131 of throat 128 corresponds to the extension of converging diameter of first inside wall portion 110 of inlet port 40. When insert 126 is mated into inlet port 40, a continuous converging diameter is provided from the inlet of port 40 inwardly into the turbocharger.

A plurality of rivet-like protrusions 140 extends from disc 130 and correspond to apertures 116 in wall 42. With the insert engaged to compressor housing 24 with the end of throat 128 engaging step 114 of inlet port 40, protrusions 140 are engaged through apertures 116 with disc 130 abutting the corresponding surface of wall 42. As is shown in FIG. 2, protrusions 140 have been inserted into apertures 116 and the heads thereof deformed to attach insert 126 to housing 24. Disc 130 extends beyond wall 42 to partially cover opening 118 of chamber 44. A circumferential gap 146 is formed between the outer tip of disc 130 and the wall of chamber 44. Additionally, a circumferential passageway 148 is formed between disc 130 and compressor backwall 100 between rotor 172 and gap 146 leading to chamber 44.

Referring still to FIG. 2, bearing support cylinder 60 is supported concentrically within inlet port 40 by a plurality of vanes 62 extending inwardly from wall surface 64 of port 40. Turbocharger 20 further includes a shaft 160 supported for rotation in bearing support cylinder 60 by two ball bearing assemblies 162 and 164. A radial flow turbine rotor 170 is mounted at one end of shaft 160 and a centrifugal flow compressor rotor 172 is mounted intermediate of turbine rotor 170 and bearing assemblies 162 and 164. Shaft 160 passes through apertures 174 and 176 in turbine backwall 102 and compressor backwall 100, respectively. A labyrinth seal 178 is provided on turbine backwall 102 to seal between compressor rotor 172 and turbine rotor 170.

Turbine rotor 170 is fixedly attached to shaft 160, such as by welding, and compressor rotor 172 is retained in position on shaft 160 by retainer nut 180. Compressor rotor 172 is drilled to receive shaft 160 and counterbored to form a bore 182. Bore 182 has a diameter larger than the outer diameter of retainer nut 180 such that retainer nut 180 may be pressed onto shaft 160 into engagement with the bottom wall 184 of bore 182 to retain the compressor rotor in position on shaft 160. A compressor blade shim 186 is positioned between compressor rotor 172 and a step 188 in shaft 160.

A ring 200 is fitted within the end of cylinder 60 adjacent compressor rotor 172 and is prevented from moving into cylinder 60 by a clip 202 attached to cylinder 60. Outer raceway 204 of bearing assembly 164 is formed in ring 200, the inner raceway 206 being integrally formed in shaft 160. Balls 208 are engaged between the inner and outer raceways to form bearing assembly 164.

Bearing assembly 162 includes inner raceway 210 formed integrally in shaft 160 and an outer ring 212 slidable within cylinder 60 with an outer raceway 214 formed therein for receiving balls 216. A compression spring 218 is engaged between ring 212 and a retaining ring 220 fixed within cylinder 60 and biases ring 212 outwardly to fix the position of balls 216 and 208 in bearing assemblies 162 and 164, respectively, thereby fixing the position of shaft 160.

As is shown in FIG. 2, outer raceway 204 is formed in ring 200 with the ball radius on only one side. Thus, the assembly of bearing assembly 164 is made by positioning a full complement of balls 208 in raceway 206, and engaging ring 200 therearound. Similarly, outer raceway 214 is formed in ring 212 with the ball radius on only one side. Balls 216 of bearing assembly 162 are assembled by outer ring 212 to compression spring 218 and inserting a full complement of balls 216 in raceway 214 of shaft 160. By releasing ring 212, spring 218 automatically forces the ring into engagement with balls 216 to form bearing assembly 162 while simultaneously engaging ring 200 against balls 208 of bearing assembly 164.

Alternatively, less than a full complement of balls 208 and 216 may be used in bearing assemblies 162 and 164 by the use of an appropriate retainer. Depending upon the application, an oil impregnated retainer or a sacrificial retainer which replenishes a self-lubricating coating to the balls may be used. The mounting of shaft 160 within cylinder 60 is completed by the engagement of cap 66 on the end of cylinder 60 to close the opening in cylinder 60 remote from compressor rotor 172.

In a preferred embodiment of the invention, bearing assemblies 162 and 164 are "starved" of oil. The only lubrication provided to the bearing assemblies is through wicks 222 and 224 which transfer oil from a reservoir R by capillary action to ramps or slingers 226. Oil supplied to slingers 226 is projected by centrifugal force to bearing assemblies 162 and 164 during rotation of shaft 160.

Referring to FIGS. 1 and 2, exhaust air from the internal combustion engine on which the turbocharger is mounted is injected into the turbocharger through turbine air inlet 54 and channeled against the blades of turbine rotor 170 through a nozzle area 230 formed by turbine backwall 102 and a wall 232 parallel thereto. This nozzle area is controlled by a plurality of movable nozzle vanes 234 positioned circumferentially about the nozzle area and rotatable to vary flow of exhaust air to turbine rotor 170. Vanes 234 include trunnions 236 and 238 extending from opposite sides thereof. Trunnion 236 extends through turbine backwall 102 and is attached to actuation lever 240. Trunnion 238 extends into wall 232.

A nipple 242 is formed on one end of each actuation lever. These nipples extend into radial holes 244 formed in a control ring 246. Control ring 246 and actuation levers 240 are situated in air space gap 247 intermediate of compressor rotor 172 and turbine rotor 170. Control ring 246 is concentrically positioned about the axis of shaft 160 and is received on a cylindrical surface 248 extending from compressor backwall 100.

In a preferred embodiment of the invention, control ring 246 includes an inner ring 250 and an outer ring 252 formed with an inner and outer raceway, respectively, for receiving a plurality of balls 254 therebetween. Inner ring 250 is fixedly attached to the cylindrical surface 248 extending from compressor backwall 100, and outer ring 252 rotates angularly relative to the inner ring. By the rotation of outer ring 252, each of the actuation levers 240 is rotated about the axis of trunnions 236 and 238 resulting in the simultaneous rotation of each nozzle vane 234. One of the actuation levers 240 is provided with an extension 262. Control rod 86 is attached to the end of extension 262 remote from nipple 242. By the movement of control rod 86, actuation lever 240 is pivoted to angularly rotate outer ring 252 of control ring 246, thereby rotating each of the other actuation levers 240 and nozzle vanes 234 attached thereto.

As discussed above, control rod 86 is controlled by piston type actuator 80. Actuator 80 is controlled by compressor discharged pressure fed into cylinder 84 through line 88. Increased pressure into actuator 80 causes the extention of control rod 86 and the corresponding opening of the compressor nozzle area. While the preferred embodiment of the invention envisions the use of a piston type actuator using compressor discharged pressure as the control parameter, it will be understood by those skilled in the art that various other types of control actuators may be used without deviating from the scope of the present invention.

FIG. 3 illustrates compressor rotor 172 and retainer nut 180 separated from turbine rotor 170 and compressor-turbine shaft 160. As is shown in FIG. 3, turbine rotor 170 is attached to one end of shaft 160, such as by welding or other suitable permanent attachment means. The shaft, prior to its attachment to turbine rotor 170, is formed with an enlarged bearing surface 160a, and a step 188 to a narrower diameter shaft portion 160b. As has been previously discussed, raceways 206 and 210 are formed directly in shaft 160.

In assembly, shaft 160 is inserted through apertures in compressor backwall 100 and turbine backwall 102. Shim 186 is positioned over shaft 160 into engagement with step 188 on shaft 160. Compressor rotor 172 is engaged over shaft 160 and rests on portion 160b. Retainer nut 180 is then pressed onto portion 160b into bore 182 of compressor rotor 172 and into engagement with bottom wall 184 of bore 182. Nut 180 consists of a sleeve having a smooth inner bore 180a therethrough. The bore through nut 180 forms an interference fit with portion 160b of shaft 160. The interference, in one embodiment of the invention, is on the order of 0.001 of an inch.

As has been previously discussed, in the summary of the invention, because the inner raceways are formed directly in the compressor-turbine shaft, the shaft must be heat treated to extremely high degrees of hardness. As a result, the present retaining sleeve secures compressor rotor 172 to shaft 160 without necessitating the grinding or cutting of threads into the hardened shaft. Thus, the cost and problem associated with forming threads on a heat treated shaft are eliminated. Further, because the shaft is substantially hardened, the retaining nut may be pressed onto the shaft and withdrawn without damage to the shaft surface.

As also shown in FIG. 3, nut 180 is formed with threads around the outer facing surface thereof. Bore 182 is of a sufficient diameter as to provide a gap 270 (FIG. 4) between bore 182 and the threads on the outer surface of nut 180. This gap permits the insertion of an appropriate internally threaded tool for withdrawing the nut from the shaft for removal of the compressor rotor.

Thus, the present invention provides a straightforward method for securing the compressor rotor of a turbocharger on the compressor-turbine shaft without requiring threading of the shaft. The sleeve has a bore therethrough for mounting the sleeve onto the shaft in abutment against the compressor rotor to retain the rotor in a fixed position on the shaft. The sleeve bore has an inside diameter forming an interference fit over the shaft such that the sleeve resists longitudinal movement of the compressor rotor along the shaft. Likewise, because of the relatively small torque experienced by the compressor rotor as it is driven by the shaft, the engagement of the rotor between the retainer nut, the shim and a step formed in the shaft, rotation of the rotor relative to the shaft is prevented.

In some applications of the present invention, a spring device may be required between the retainer nut and the compressor rotor to maintain an axial force on the compressor rotor during expansion and contraction of components of the turbocharger. Unlike an internally threaded nut engaged on a threaded shaft, the retainer nut of the present invention does not have the capability of developing high compressive loading in the compressor rotor or tension in the compressor-turbine shaft when mounted in position. Therefore, in the alternative embodiment illustrated in FIG. 5, a cone shape or Belville spring 272 is inserted between the retainer nut and the compressor rotor.

Because the components in the embodiment illustrated in FIG. 5 are identical or correspond to elements in the embodiment illustrated in FIGS. 1-4, the same numeral, with the designation prime (') will be used to identify like or corresponding parts to those in the embodiment illustrated in FIGS. 1-4. Referring now to FIG. 5, shaft 160' is engaged through compressor rotor 172'. Retainer nut 180' is engaged over the end of shaft 160' with Belville spring 272 mounted on shaft 160' between nut 180' and wall 184' of bore 182' in compressor rotor 172'. Belville spring 272 is initially compressed as retainer nut 180' is mounted on shaft 160'. The engagement of nut 180' against shaft 160' is sufficient to overcome any expansive forces developed between nut 180' and compressor rotor 172' by Belville spring 272. Instead, the compression of spring 272 between rotor 172' and nut 180' induces an axial load in rotor 172'. Thus, with spring 272 in place, contractions or expansions in shaft 160' or compressor rotor 172' will not result in a zero engagement force between nut 180' and rotor 172'.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. While use of the retaining nut of the present invention has been described as applied to a turbocharger wherein the compressor rotor and turbine rotor are overhung to one side and supported from a shaft rotatable on ball bearing assemblies, it will be apparent to one skilled in the art that the present invention may readily be adapted to turbochargers of the conventional design having the compressor rotor and turbine rotor supported on opposite sides of the shaft bearing support assemblies. In application of the present invention to this or other turbocharger designs, the retainer sleeve may be used to attach the compressor rotor to the compressor-turbine shaft on the opposite side of the bearing support from the turbine motor. This would be accomplished by substituting the arrangement of the present invention for the heretofore threaded nut used to engage the shaft formed with threads on the compressor rotor end. In use of the present invention, the compressor rotor would be mounted on the shaft and a retaining sleeve engaged with an interference fit over the end of the shaft to secure the rotor to the shaft. As described above, the compressor rotor may be engaged between a step in the shaft and the retaining sleeve such that rotation of the rotor relative to the shaft is prevented. Likewise, the engagement of the sleeve on the shaft will prevent movement of the rotor along the longitudinal axis of the shaft.

An alternative embodiment of the present invention is illustrated in FIGS. 6, 7 and 8. Because the components in the embodiment illustrated in FIGS. 6, 7 and 8 are identical or correspond to elements in the embodiment illustrated in FIGS. 1-4, the same numeral, with the designation double prime (") will be used to identify parts corresponding to those illustrated in FIGS. 1-4. In this alternative embodiment, a pair of lugs 300 extend from surface 302 of sleeve 180". Surface 304 of rotor 172" is formed with corresponding grooves 306 therein. In this arrangement, sleeve 180" forms an interference with shaft 160" and is pressed thereon such that surface 302 of sleeve 180" is adjacent to but not in contact with surface 304 of compressor rotor 172". Rotational force from shaft 160" is transmitted through sleeve 180" and to compressor rotor 172" through the engagement of lugs 300 with grooves 306.

While the present invention is intended to cover the application of the retaining means of the present invention wherein sleeve 180" is mounted on shaft 160" such that surface 302 is in engagement with surface 304 of compressor rotor 172", it has been found that where the surfaces are not precisely perpendicular to the longitudinal axis of shaft 160", the forcing of sleeve 180" into contact with compressor rotor 172" can result in the bending of shaft 160". In turn, this produces an imbalance in compressor rotor 172". The embodiment of FIGS. 6, 7 and 8 eliminates this possibility by transmitting the rotation of the force between shaft 160" and compressor rotor 172" through lug 300 extending from sleeve 180" and into engagement with grooves 306 of compressor rotor 172".

Although a gap, normally on the order of 0.001 or 0.002 of an inch, may exist between sleeve 180" and compressor rotor 172", this gap is automatically closed upon operation of the present turbocharger as a result of the tendency of the compressor rotor to move toward sleeve 180" during operation. As can be seen in FIG. 7, it is also not critical that lugs 300 closely correspond in dimension to grooves 306. Grooves 306 may be slightly larger than lugs 300 without affecting the operation of the present invention, although it will be understood by those skilled in the art that a close fit between lugs 300 and grooves 306 may also be used. Where grooves 306 are slightly larger than lugs 300, any slack therebetween will be immediately taken up upon rotation of shaft 160" and the engagement of lugs 300 with the forward surface of groove 306. The embodiment illustrated in FIGS. 6, 7 and 8 thereby provides for the transmission of rotational forces of shaft 160" to compressor rotor 172" while eliminating the possibility of bending the shaft as a result of advancing a threaded nut on the end of the shaft or by pressing a retaining sleeve onto the shaft into frictional engagement with the compressor rotor.

Although not conventional in turbocharger design, the retainer of the present invention may be used to secure both the turbine and compressor rotors to the shaft by mounting the rotors on opposite ends of the shaft against a flange or step and then mounting a retainer nut of the present invention on the shaft end against the rotors. Thus, the present invention is intended to encompass this and other rearrangements, modifications and substitutions of parts and elements as fall within the scope of the appended claims. Moreover, while the present discussion refers mainly to the application of the present invention to turbochargers, the invention can readily be applied to other types of turbomachinery.

We claim:

1. In turbomachinery comprising a compressor rotor mounted for rotation on a compressor shaft, a retainer for securing the compressor rotor to the compressor shaft, wherein the compressor rotor has an aperture therethrough for receiving the compressor shaft therein, comprising:
   a retaining sleeve having a bore therethrough for mounting said sleeve onto said shaft for abutment against the compressor rotor, said sleeve bore defining an interior surface substantially conforming to and for engaging only said shaft, said bore having a diameter to form an interference fit over the shaft such that said sleeve alone prevents movement of the rotor relative to the shaft in the direction of said sleeve.

2. In turbomachinery comprising a compressor rotor mounted for rotation on a compressor shaft, a retainer for securing the compressor rotor to the compressor shaft, wherein the compressor rotor has an aperture therethrough for receiving the compressor shaft therein, comprising:
   a retaining sleeve having a bore therethrough for mounting said sleeve onto said shaft for abutment against the compressor rotor, said sleeve bore having a diameter to form an interference fit over the shaft such that said sleeve fixes the rotor relative to the shaft, and
   spring means positioned between said retaining sleeve and the compressor rotor for applying a force between the compressor rotor and the retaining sleeve for maintaining an axial force on the compressor rotor.

3. In turbomachinery comprising a compressor rotor mounted for rotation on a compressor shaft, a retainer for securing the compressor rotor to the compressor shaft, wherein the compressor rotor has an aperture therethrough for receiving the compressor shaft therein, comprising:
   a retaining sleeve having a bore therethrough for mounting said sleeve onto said shaft for abutment against the compressor rotor, said sleeve bore having a diameter to form an interference fit over the shaft such that said sleeve fixes the rotor relative to the shaft, wherein said sleeve is formed with threads around the outer circumference to permit engagement of said sleeve and for removal thereof.

4. In turbomachinery comprising a compressor rotor mounted for rotation on a compressor shaft, a retainer for securing the compressor rotor to the compressor shaft, wherein the compressor rotor has an aperture therethrough for receiving the compressor shaft therein, comprising:
   a retaining sleeve having a bore therethrough for mounting said sleeve onto said shaft for abutment against the compressor rotor, said sleeve bore having a diameter to form an interference fit over the shaft such that said sleeve fixes the rotor relative to the shaft, said sleeve being formed with threads around the outer circumference to permit engagement of said ring and for removal thereof and wherein the outer diameter of said sleeve is sized to be received within a recess formed in said compressor rotor concentrically with said aperture in said rotor such that the threads on said sleeve may be engaged for extracting said sleeve from said shaft.

5. A turbocharger, comprising:
   a housing,
   a shaft,
   bearing means supported in said housing for supporting said shaft for rotation relative to said housing,
   a turbine rotor fixedly attached to said shaft,
   a compressor rotor having an aperture therethrough for mounting said compressor rotor on said shaft, and
   a retaining sleeve having a bore therethrough to form a circular substantially smooth inner diameter surface, said sleeve being adaptable for mounting on said shaft for abutment against said compressor rotor, said sleeve bore having a diameter to form an interference fit over said shaft such that said sleeve alone prevents movement of said compressor rotor relative to said shaft in the direction of said sleeve.

6. A turbocharger, comprising:

a housing, a shaft, bearing means supported in said housing for supporting said shaft for rotation relative to said housing, a turbine rotor fixedly attached to said shaft, a compressor rotor having an aperture therethrough for mounting said compressor rotor on said shaft, a retaining sleeve having a bore therethrough to form a circular substantially smooth inner diameter surface, said sleeve being adaptable for mounting on said shaft for abutment against said compressor rotor, said sleeve bore having a diameter to form an interference fit over said shaft such that said sleeve prevents movement of said compressor rotor relative to said shaft, and spring means mounted on said shaft between said retaining sleeve and said compressor rotor for applying an axial force on said compressor rotor.

7. The turbocharger according to claim 6 wherein said compressor rotor is formed with a recess concentric with said aperture therethrough, said recess being of sufficient depth and height to receive said retaining sleeve therein.

8. The turbocharger according to claim 6 wherein said shaft is formed with a step thereon for engagement of said compressor rotor between said step and said retaining sleeve.

9. A turbocharger comprising:

a housing having a compressor inlet and compressor exhaust, a turbine inlet and a turbine exhaust, a turbine positioned in said housing to receive engine exhaust from the turbine inlet for driving the turbine and discharging the exhaust through the turbine exhaust, a hardened shaft attached to said turbine, a centrifugal flow compressor rotor having an aperture therethrough for mounting said rotor on said shaft extending from said turbine, a retaining sleeve defining an aperture therethrough for mounting said sleeve on said shaft for abutment against said compressor rotor such that said sleeve alone prevents movement of said rotor along the longitudinal axis of said shaft in the direction of said sleeve, and bearing raceways formed on said shaft to one side of said compressor rotor remote from the turbine rotor, bearing support structure formed in said housing for positioning ball bearings between said bearing support structure and said raceways on said shaft to support said shaft, compressor rotor and turbine rotor relative to said housing.

10. A turbocharger comprising:

a housing having a compressor inlet and compressor exhaust, a turbine inlet and a turbine exhaust, a turbine positioned in said housing to receive engine exhaust from the turbine inlet for driving the turbine and discharging the exhaust through the turbine exhaust, a hardened shaft attached to said turbine, a centrifugal flow compressor rotor having an aperture therethrough for mounting said rotor on said shaft extending from said turbine, a retaining sleeve defining an aperture therethrough for mounting said sleeve on said shaft for abutment against said compressor rotor to fix said rotor relative to said shaft, bearing raceways formed on said shaft to one side of said compressor rotor remote from the turbine rotor, bearing support structure formed in said housing for positioning ball bearings between said bearing support structure and said raceways on said shaft to support said shaft, compressor rotor and turbine rotor relative to said housing, and spring means mounted on said shaft between said retaining sleeve and said compressor rotor for applying an axial force on said compressor rotor.

11. In turbomachinery comprising a compressor rotor mounted for rotation on a compressor shaft, a retainer for securing the compressor rotor to the compressor shaft, wherein the compressor rotor has an aperture therethrough for receiving the compressor shaft therein, comprising:

a retaining sleeve having a bore therethrough for mounting said sleeve onto said shaft adjacent the compressor rotor, said sleeve bore defining an interior surface substantially conforming to and for engaging only said shaft, said bore having a diameter to form an interference fit over the shaft such that said sleeve prevents movement of the rotor relative to the shaft in the direction of said sleeve, and lug means extending from said retaining sleeve for engaging the compressor rotor to transmit a rotational force from the shaft to the compressor rotor through said lug means.

12. The retainer means according to claim 11 wherein said lug means includes a lug extending from the face on said retaining sleeve substantially perpendicular to the longitudinal axis of the compressor shaft for receipt into a corresponding groove in the compressor rotor whereby rotational forces from the shaft are transmitted to the compressor rotor through said lug.

13. In turbomachinery comprising a compressor rotor mounted for rotation on a compressor shaft, a retainer for securing the compressor rotor to the compressor shaft, wherein the compressor rotor has an aperture therethrough for receiving the compressor shaft therein, comprising:

a retaining sleeve having a bore therethrough for mounting said sleeve onto said shaft for abutment against the compressor rotor, said sleeve bore having a diameter to form an interference fit over the shaft such that said sleeve prevents movement of the rotor relative to the shaft in the direction of said sleeve, said sleeve being formed with threads around the outer circumference to permit engagement of said ring and for removal thereof, and lug means extending from said retaining sleeve for engaging the compressor rotor to transmit a rotational force from the shaft to the compressor rotor through said lug means.

14. The retainer nut means according to claim 13 wherein the outer diameter of said sleeve is sized to be received within a recess formed in said compressor rotor concentrically with said aperture in said rotor such that the threads on said sleeve may be engaged for extracting said sleeve from said shaft.

* * * * *